No. 699,808. Patented May 13, 1902.
W. NORRIS.
MOTOR VEHICLE.
(Application filed July 2, 1901.)
(No Model.) 6 Sheets—Sheet I.

WITNESSES:
INVENTOR
ATTORNEYS

No. 699,808. Patented May 13, 1902.
W. NORRIS.
MOTOR VEHICLE.
(Application filed July 2, 1901.)
(No Model.) 6 Sheets—Sheet 2.

No. 699,808. Patented May 13, 1902.
W. NORRIS.
MOTOR VEHICLE.
(Application filed July 2, 1901.)
(No Model.) 6 Sheets—Sheet 3.

Witnesses:
Allan Foose.
J. C. Delaney

Inventor:
W. Norris

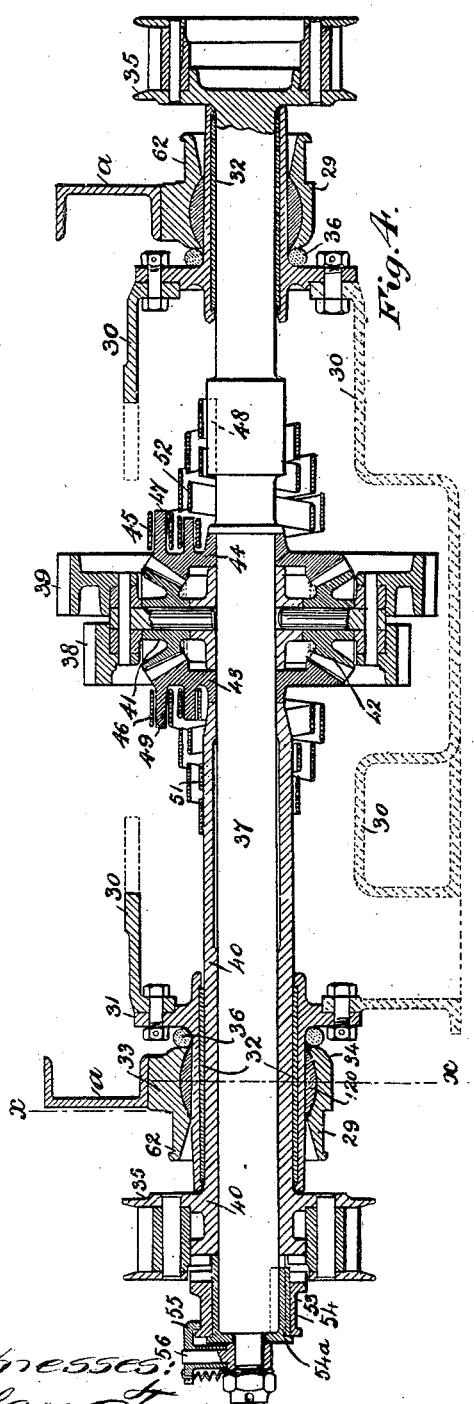

No. 699,808. Patented May 13, 1902.
W. NORRIS.
MOTOR VEHICLE.
(Application filed July 2, 1901.)
(No Model.) 6 Sheets—Sheet 5.
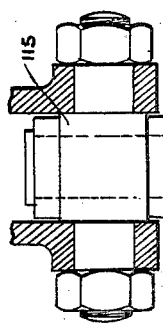
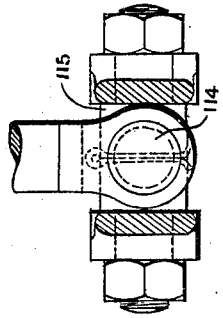
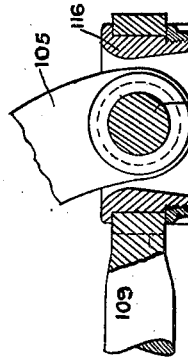
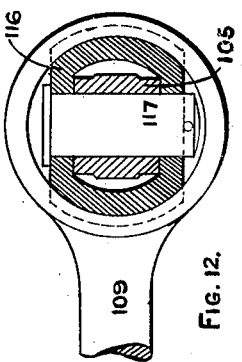
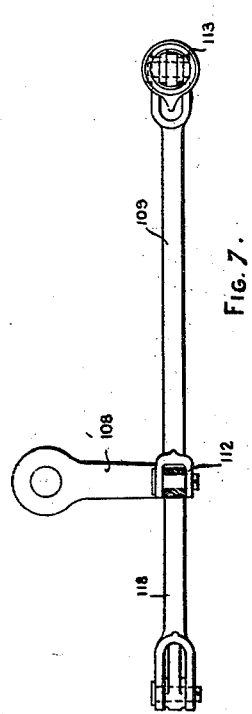
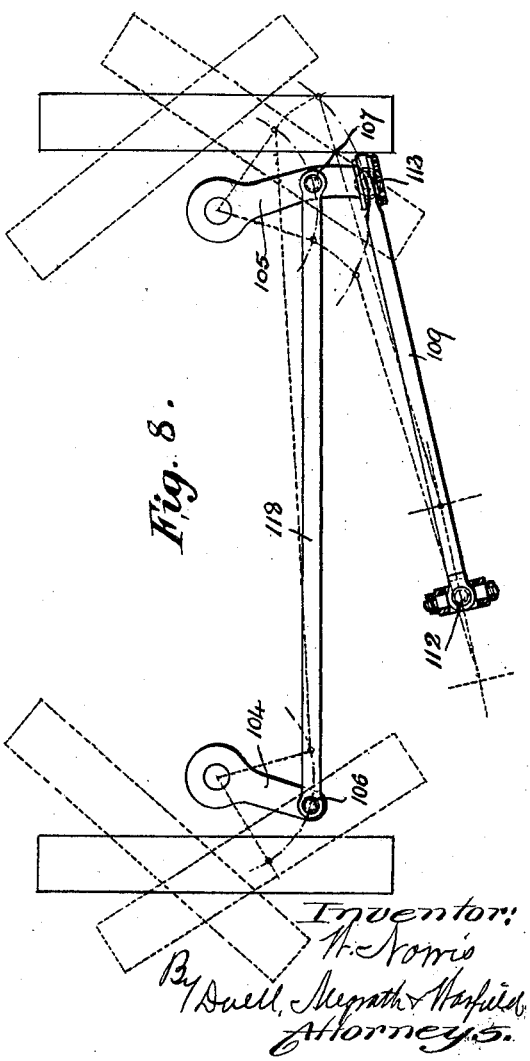

No. 699,808. Patented May 13, 1902.
W. NORRIS.
MOTOR VEHICLE.
(Application filed July 2, 1901.)
(No Model.) 6 Sheets—Sheet 6.
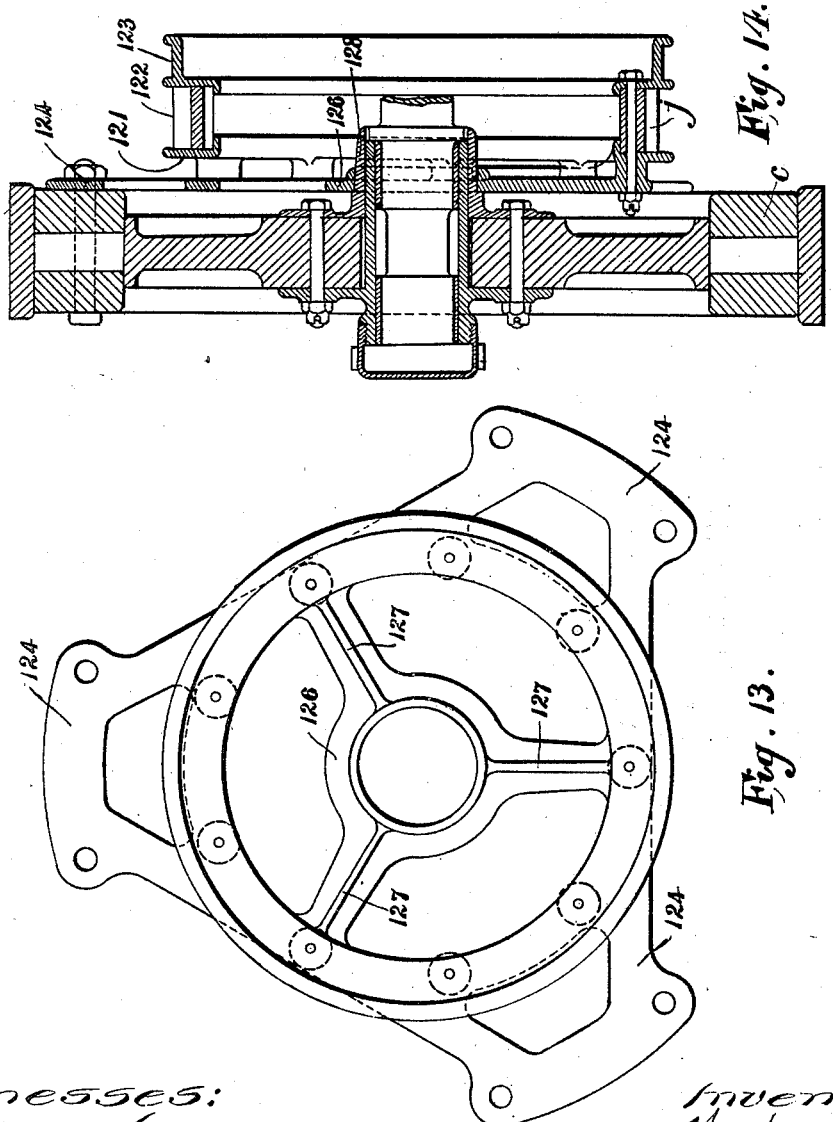

UNITED STATES PATENT OFFICE.

WILLIAM NORRIS, OF PRESTON, ENGLAND, ASSIGNOR TO T. COULTHARD & COMPANY, LIMITED, OF PRESTON, ENGLAND.

MOTOR-VEHICLE.

SPECIFICATION forming part of Letters Patent No. 699,808, dated May 13, 1902.

Application filed July 2, 1901. Serial No. 66,828. (No model.)

*To all whom it may concern:*

Be it known that I, WILLIAM NORRIS, a subject of the King of Great Britain and Ireland, residing at Cooper road, Preston, England, have invented certain new and useful Improvements Relating to Motor-Vehicles, (for which I have made application for Letters Patent in Great Britain, No. 9,584, bearing date May 8, 1901,) of which the following is a specification.

My invention relates to motor-vehicles, and has for its object to provide an improved construction and arrangement of working parts.

The first part of my invention consists in an improved bearing adapted to yieldingly support the gearing-shafts, whereby considerable twisting or distortion of the framework of the vehicle may occur without detrimental effect to the shaft and gearing.

The second part of my invention consists in applying spiral or helical springs to the connection between the driving and driven shafts in a motor-vehicle.

The third part of my invention consists in triangular driving attachment secured to the road-wheels.

Figure 1:
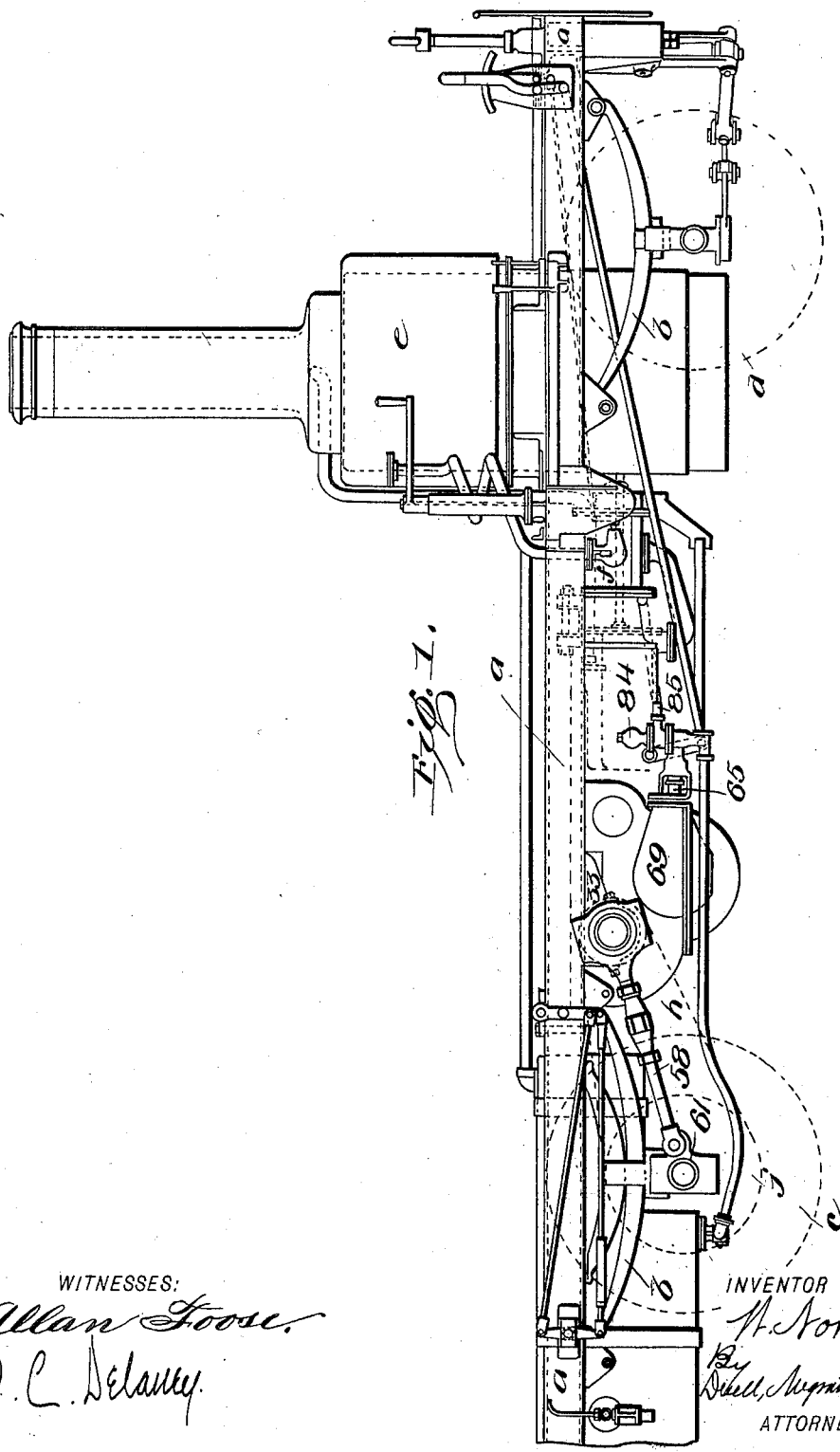
Figure 2:
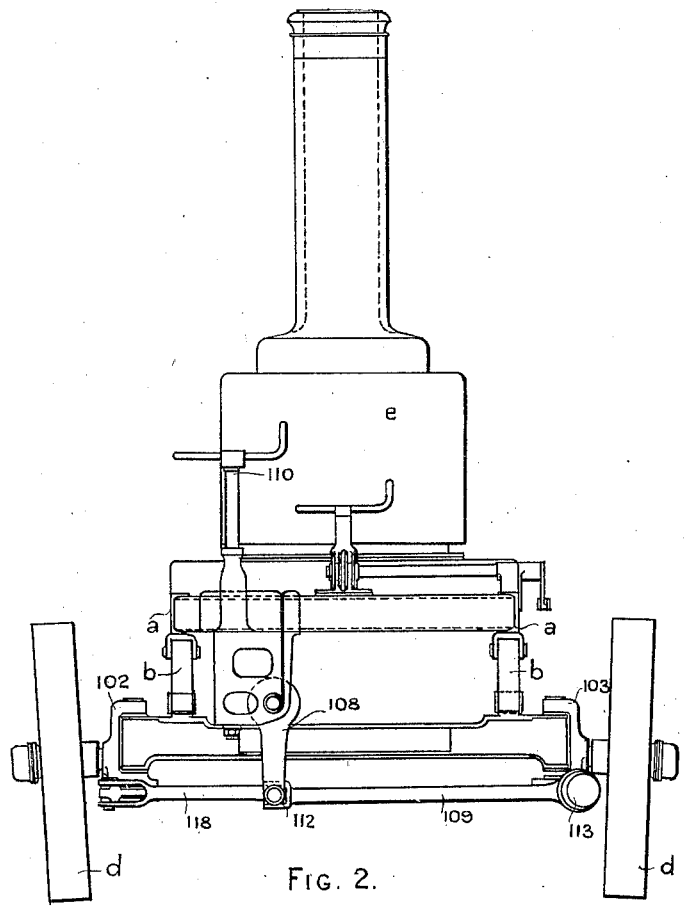
Figure 3:
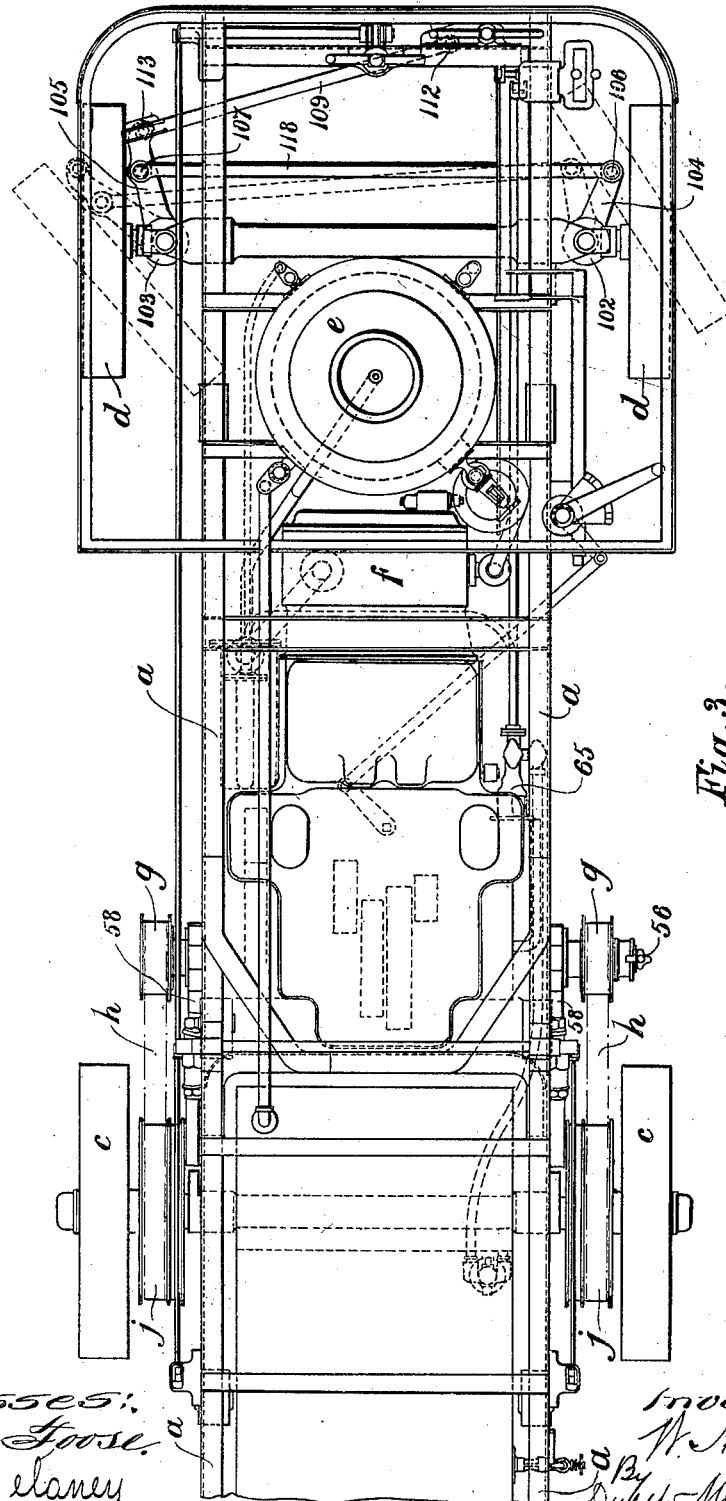

Referring now to the accompanying drawings, Figure 1 is a side elevation of a motor-vehicle with my improvements applied thereto. Figs. 2 and 3 are a front elevation and plan, respectively, of the same. Fig. 4 is a vertical section of the yielding bearings, differential gear, and spring-drive. The extreme left of this figure shows a vertical section of a compensating gear clutch or lock. Fig. 5 is a plan of this gear clutch or lock. Fig. 6 is a section through X X of Fig. 4, showing my improved yielding bearing. Figs. 7 and 8 are elevation and plan, respectively, of the steering-gear shown detached from the vehicle. Figs. 9 to 12 show details of the steering-gear link ends. Figs. 13 and 14 are elevation and sectional plan, respectively, of the chain-wheel, the latter view showing also the road-wheel in section.

In carrying out my invention I construct the framing of the motor-vehicle of channels $a\ a$, Figs. 1 to 3, carried by springs $b\ b$ on suitable road-wheels $c\ c\ d\ d$. Toward the front of the vehicle I arrange a vertical steam-boiler $e$, supplying steam to a compound engine $f$. This engine operates sprocket-wheels $g\ g$ by means of gearing, (not shown,) the working parts of the engine and the gearing being inclosed in a suitable dust-excluding casing, forming an oil-bath. Motion is transmitted from the sprocket-wheels $g\ g$ by means of chains $h\ h$ to other sprocket-wheels $j\ j$, secured to the rim of the road-wheels $c\ c$.

In motor-vehicles traveling over rough and uneven roads inconvenience and trouble frequently occur with the compensating-gearing-shaft bearings owing to the twisting and distortion of the framework of the vehicle. By the first part of my invention I obviate these difficulties, and in carrying it into effect, as illustrated in Figs. 4 to 6, I provide each end of the compensating shaft 37 with a divided bearing 29, consisting of a long sleeve firmly bolted by means of a flange 31 to the casing 30, within which the gearing and working parts of the engine are inclosed. The outside of this sleeve bears closely against the chain-wheels 35, and the sleeve may be provided with a lining of white metal or other suitable antifriction material 32. The shaft and casing are supported by a bearing-bracket 33, firmly secured to the main framing of the vehicle and provided with a detachable cover 34. I place between the bearing 29 and bracket 33 a divided ring 120, whose inner surface is flat and an easy fit over the bearing 29, while its outer surface is convex and knuckles into a corresponding recess in the bracket and cover. This convex bearing permits considerable uneven vertical movement of the framing to occur without injury to the gearing. I provide for distortion of the framing in a transverse direction by placing a flexible distance-ring 36, of rubber or other suitable yielding material, between the flange 31 of the sleeve-bearing 29 and the bracket 33.

I provide each end of the shaft 37 with an adjustable strut 58, (see Figs. 1 and 3,) one end of each rod being pivotally attached to the axle 61 of the road-wheels, while the other end of each rod bears against the bearing-bracket 33 in the groove 62, Fig. 4.

In carrying out the second part of my invention I provide the vehicle with a flexible drive adapted to prevent shocks from passing through the wheels on the road to the driving-engine and gear connecting the motor-engine with the road-wheels. As illustrated in Fig. 4, I mount the differential gear on the center of the shaft 37. It consists of two spur-wheels 38 and 39, which are fast and slow speed-wheels, respectively, connected to each other and operating the usual "jack-in-the-box" gearing, comprising two small bevel-wheels 41 and 42 in gear, respectively, with two bevel-wheels 43 and 44, mounted loosely upon the shaft 37. One of the chain-wheels 35, however, I form in one piece with or firmly secure to a long sleeve 40, within which the shaft may turn. The sleeve 40 extends from the chain-wheel to the back of the bevel-wheel 43. I connect the differential gear to the shaft 37 and the sleeve 40 through two conically-coiled helical springs 45 and 46, preferably of flat section. One end of the spring 45 is bent over a projection 47, carried by the bevel-wheel 44, its other end being secured with a keyway or recess 48, formed in the shaft 37. The spring 46 has its one end bent over a similar projection 49, carried by the bevel-wheel 43, while its other end is suitably secured to the sleeve 40. It will be seen that these springs take up any shocks transmitted through either of the chain-wheels when the vehicle is moving in one direction. To enable the same advantages to be maintained when the vehicle is reversed, I provide two similar springs 51 and 52, coiled within the first-mentioned spring and fixed to the bevel-wheels and shaft or sleeve by the same means as, but coiled in the opposite direction to, the outer springs. It is evident that I could modify this arrangement by employing only one forward-motion spring and one reverse-motion spring without departing from my invention. Again, I may provide a single spring connection between each bevel-wheel of the differential gear and the driven shaft, this spring connection being sufficiently rigid to be driven either backward or forward. For this purpose I prefer an ordinary cylindrical coiled spring of heavy section, one end of the spring being attached to the back of the bevel-wheel of the differential gear and the other end attached to the driven shaft. In order to limit the range of this spiral spring, I sometimes provide an exterior cylindrical surface, against which the spring can close on the forward drive, and also an interior cylindrical surface, against which it abuts on the backward drive—that is, the spring is placed in an annulus between two cylindrical surfaces which limit its range.

The sleeve 40 may be locked to the shaft 37 by means of my improved clutch. (Seen in section on the extreme left of Fig. 4 and in plan in Fig. 5.) It consists of a short sleeve 53, provided with claws adapted to enter corresponding recesses in the side of the chain-wheel. The sleeve is guided by a feather 54, sunk in the shaft 37. A sleeve 54ª is also provided, through which the feather 54 projects for the purpose of preventing longitudinal movement between the sleeve 40 and the shaft 37, thus preventing the bevel-gear spreading. The clutch is held in or out of gear by a spring-tensioned clutch 55, mounted on a short spindle 56, fixed to a projection on the shaft 37.

I provide the motor-vehicle with an improved steering-gear designed to avoid the imperfect movement caused by the well-known double-jointed links heretofore employed. I mount the front road-wheels on separate arms 102 and 103, pivotally attached to the main axle of the vehicle. (See Figs. 1, 2, and 3.) The pivoted axle-arm 102 carries a lever 104. The axle-arm 103 also carries a similar, but longer, lever 105. (See also Figs. 7 and 8.) I connect these two levers by means of a rod 118, pivoted to them at 106 and 107, respectively, and connect the extreme end of the lever 105 by a connecting-rod 109 to vertical levers 108, operated through gearing (not shown) by a handle 110 on the platform in front of the boiler. It will be noticed that in steering the vehicle the connecting-rod 109 requires to move simultaneously in a vertical and a horizontal plane. In order that the joints 112 and 113 of this rod may accommodate themselves to this double movement, I form them in the manner shown in detail in Figs. 9 to 12, Figs. 9 and 10 being sectional plan and elevation, respectively, of the joint 112 and Figs. 11 and 12 sectional plan and elevation, respectively, of the joint 113. The end of the connecting-rod at joint 112 is forked and is provided with a pivot-pin 114, which passes through another pin 115, secured between the ends of the levers 108. The other end of the connecting-rod at joint 113 is circular and is bored to receive a circular hollow block 116. The extreme end of the lever 105 enters the block 116, to which it is connected by means of a pin 117. By connecting the steering-gear in this manner movement of the connecting-rod 109 in a vertical and horizontal plane is freely permitted.

In carrying out the third part of my invention, as illustrated in Figs. 13 and 14, I construct the chain-wheel j preferably in three pieces 121, 122, and 123, the part 122 being an annular toothed ring securely held between the parts 121 and 123 by bolts passing through them. The chain-wheel is secured to the rim of the road-wheel by means of bolts passing through holes in arms 124, cast on the portion 121. The chain-wheel is kept central in relation to the road-wheel by means of an eye or boss 126, carried by arms 127, formed on the part 121 of the chain-wheel, the boss 126 being adapted to fit over the inside hub 128 of the road-wheel c.

In the modification shown in the drawings the chain-wheel carries three arms joined together by webs; but it is evident that any suitable number of arms or a disk may be employed instead of the three arms described without departing from my invention.

It will be observed that by securing the chain-wheel to the rim of the road-wheel in this manner the spokes of the latter act merely as carriers and do not transmit any of the driving force from the motor.

Having described my invention, what I claim as new, and desire to secure by Letters Patent, is—

1. In motor-propelled vehicles an improved yielding bearing comprising a divided sleeve, a flange formed on the sleeve, a divided ring of plano-convex longitudinal section loosely fitting around the sleeve, a supporting-bracket and cover, a concave recess formed around the inside of the bracket and cover corresponding to the convex surface of the divided ring which bears in said recess, and a flexible ring placed between the bracket and flange around the divided sleeve, whereby slight movement of the shaft in a vertical plane and laterally may occur, substantially as described.

2. In a motor-vehicle, an improved spring-drive consisting of two springs coiled in opposite directions one end of each spring being attached to the shaft carrying the chain-wheels and other end of each spring being secured to the compensating gear, whereby shocks from the road-wheels are prevented from being transmitted to the motors when running in a forward or backward direction, substantially as described.

3. In a motor-vehicle, an improved spring-drive consisting of two sets of coiled springs, each set comprising two conically-coiled springs arranged one within the other but coiled in opposite directions, one end of each spring in the two sets being attached to the compensating gear, and the other end of each spring being attached to the shaft carrying the chain-wheel, substantially as described.

4. In a motor-propelled vehicle, an improved spring-drive, comprising a spiral spring having one end attached to the compensating gear-wheel and the other to the shaft carrying the chain-wheels, a circular rim formed on the gear-wheel thereby inclosing the spring, substantially as described.

5. In a motor-vehicle, an improved arrangement of compensating gearing and shafting, comprising a "jack-in-the-box" gearing mounted loosely upon a main shaft, a chain-wheel carried by the shaft on one side of the compensating gearing a sleeve extending over the shaft on the other side of the compensating gearing, said shaft projecting somewhat beyond the sleeve, a clutch sliding on this projecting portion of the shaft, a chain-wheel carried by the sleeve, clutch-jaws formed on the chain-wheel, spring connections between the "jack-in-the-box" gearing and both the shaft and the sleeve, substantially as described.

6. In a motor-vehicle, in combination with a compensating gear-shaft and sleeve operated by "jack-in-the-box" gearing, a clutch comprising, a sleeve sliding upon the main gearing-shaft, a collar formed on the sleeve, a feather on the shaft and corresponding keyway on the sleeve, clutch-teeth formed on the face of the sleeve adapted to engage with recesses in the chain-wheel, a finger-bracket secured to the end of the shaft, a spring-controlled latch loosely supported by the finger-bracket, whereby the clutch may be held in or out of gear with the chain-wheel substantially as described.

7. In a motor-propelled vehicle, in combination with a road-wheel, a chain-wheel having a central eyepiece fitting over the hub of the road-wheel, arms carried by the chain-wheel, said arms being attached to the rim of the road-wheel whereby the power of the motor is transmitted directly to the rim of the wheel, substantially as described.

In witness whereof I have hereunto set my hand in presence of two witnesses.

WILLIAM NORRIS.

Witnesses:
 ARTHUR TAYLOR,
 THOMAS ECCLES GILL.